United States Patent
Albanese, Jr. et al.

(10) Patent No.: US 6,802,149 B1
(45) Date of Patent: Oct. 12, 2004

(54) FISH CUTTING DEVICE AND METHOD OF USING

(76) Inventors: John N. Albanese, Jr., 10-1/2 Lloyd Cir., Wilmington, DE (US) 19810; Pamela R. Albanese, 10-1/2 Lloyd Cir., Wilmington, DE (US) 19810

( * ) Notice: Subject to any disclaimer, the term of this patent is extended or adjusted under 35 U.S.C. 154(b) by 0 days.

(21) Appl. No.: 10/306,430

(22) Filed: Nov. 27, 2002

(51) Int. Cl.[7] ............................................. A01K 97/00
(52) U.S. Cl. .................................................. 43/4
(58) Field of Search ........................... 43/4, 4.5, 54.1, 43/55, 44.99; 452/185, 194; 206/315.11; 83/856, 857, 858

(56) References Cited

U.S. PATENT DOCUMENTS

| | | | | |
|---|---|---|---|---|
| 2,245,978 A | * | 6/1941 | Hyland | 83/553 |
| 3,216,474 A | * | 11/1965 | Popeil | 83/662 |
| 5,692,424 A | * | 12/1997 | Wallace | 83/167 |
| 5,720,124 A | * | 2/1998 | Wentzell et al. | 43/44.99 |
| 5,791,479 A | * | 8/1998 | Beres | 206/541 |
| 6,460,699 B1 | * | 10/2002 | McGregor | 206/315.11 |

* cited by examiner

Primary Examiner—Kurt Rowan

(57) ABSTRACT

A fish cutting device and method of using is disclosed for cutting fish into bait pieces. The device comprising: a bucket and a lid attached to the bucket. The lid includes a bottom plate, a hinge and a top plate. The bottom plate has at least one orifice with a corresponding cutting edge set attached to the bottom plate, so that a portion of the cutting edge set traverses across the orifice in the bottom plate. The top plate is pivotally attached to the bottom plate. The top plate has at least one convex protrusion attached to the lower surface of the top plate which is correspondingly aligned with the orifice of the bottom plate. When the lid is in a closed position then a portion of the convex protrusion is slidably inserted through a portion of the orifice of the bottom plate. Each convex protrusion also has a channel set etched in it. Each channel set of each convex protrusion has a configuration matching the corresponding cutting edge set traversing across the corresponding orifice of the bottom plate. The method of using comprises the steps of detaching, freezing, getting, grabbing, hanging, hoisting, lifting, placing, pushing, removing, unhooking, and unlocking.

18 Claims, 5 Drawing Sheets

FISH CUTTING DEVICE AND METHOD OF USING

FIELD OF THE INVENTION

The present invention relates to sporting equipment, more particularly to a fish cutting device and associated method of using the device to rapidly cut fish into a plurality of bait pieces.

DESCRIPTION OF THE PRIOR ART

Fishing has for eons been both a profession and an avocation. In order to draw fish towards a fishing vessel, oftentimes one must rapidly cut fish into bait pieces as chum. Part of the danger in cutting a plurality of bait pieces is that the cutter may also be injured due to being tossed around during rough oceans while holding onto the knife.

A wide variety of sporting equipment devices is currently available on the commercial market and an even larger number of these types of devices are known in the art of sporting equipment devices, for example, the cutting device disclosed by Larson in U.S. Pat. No. 2,223,828; the sportsman's combination receptable and ice chest disclosed by Doughty in U.S. Pat. No. 3,958,359; the bait storage, cooler and tackle holder arrangement disclosed by Testa, Jr. in U.S. Pat. No. 5,305,544; the portable cooler with suspended grate for ice-free storage areas disclosed by Brown and Starling in U.S. Pat. No. 5,605,056; the multiple use shelf for cooler disclosed by Steffes in U.S. Pat. No. RE32,740; and the cutting board disclosed by Gruber in U.S. Pat. No. D212, 494.

While all of the above-described devices fulfill their respective, particular objectives and requirements, the aforementioned patents do not describe a fish cutting device having a bucket and a lid attached to the bucket in which the lid includes a bottom plate, a hinge and a top plate. The bottom plate having at least one orifice with a corresponding cutting edge set attached to the bottom plate, so that a portion of the cutting edge set traverses across the orifice in the bottom plate. The top plate having at least one convex protrusion attached to the lower surface of the top plate which is correspondingly aligned with the orifice of the bottom plate. When the lid is in a closed position then a portion of the convex protrusion is slidably inserted through a portion of the orifice of the bottom plate. Each convex protrusion also having a channel set etched in it. Each channel set of each convex protrusion having a configuration matching the corresponding cutting edge set traversing across the corresponding orifice of the bottom plate. This combination of elements would specifically match the user's particular individual needs of making it possible to rapidly cut fish into a plurality of bait pieces. The above-described patents make no provision for a fish cutting device having a bucket and a lid attached to the bucket in which the lid includes a bottom plate, a hinge and a top plate. The bottom plate having at least one orifice with a corresponding cutting edge set attached to the bottom plate, so that a portion of the cutting edge set traverses across the orifice in the bottom plate. The top plate having at least one convex protrusion attached to the lower surface of the top plate which is correspondingly aligned with the orifice of the bottom plate. When the lid is in a closed position then a portion of the convex protrusion is slidably inserted through a portion of the orifice of the bottom plate. Each convex protrusion also having a channel set etched in it. Each channel set of each convex protrusion having a configuration matching the corresponding cutting edge set traversing across the corresponding orifice of the bottom plate.

Therefore, a need exists for a new and improved fish cutting device having a bucket and a lid attached to the bucket in which the lid includes a bottom plate, a hinge and a top plate. The bottom plate having at least one orifice with a corresponding cutting edge set attached to the bottom plate, so that a portion of the cutting edge set traverses across the orifice in the bottom plate. The top plate having at least one convex protrusion attached to the lower surface of the top plate which is correspondingly aligned with the orifice of the bottom plate. When the lid is in a closed position then a portion of the convex protrusion is slidably inserted through a portion of the orifice of the bottom plate. Each convex protrusion also having a channel set etched in it. Each channel set of each convex protrusion having a configuration matching the corresponding cutting edge set traversing across the corresponding orifice of the bottom plate. In this respect, the fish cutting device according to the present invention substantially departs from the conventional concepts and designs of the prior art, and in doing so provides an apparatus primarily developed for providing a means of making it possible to rapidly cut fish into a plurality of bait pieces.

SUMMARY OF THE INVENTION

The present device and method, according to the principles of the present invention, overcomes the shortcomings of the prior art by providing a fish cutting device and method of using for cutting fish into bait pieces. The device comprising: a bucket and a lid attached to the bucket. The lid includes a bottom plate, a hinge and a top plate. The bottom plate has at least one orifice with a corresponding cutting edge set attached to the bottom plate, so that a portion of the cutting edge set traverses across the orifice in the bottom plate. The top plate is pivotally attached to the bottom plate. The top plate has at least one convex protrusion attached to the lower surface of the top plate which is correspondingly aligned with the orifice of the bottom plate. When the lid is in a closed position then a portion of the convex protrusion is slidably inserted through a portion of the orifice of the bottom plate. Each convex protrusion also has a channel set etched in it. Each channel set of each convex protrusion has a configuration matching the corresponding cutting edge set traversing across the corresponding orifice of the bottom plate. The method of using comprises the steps of detaching, freezing, getting, grabbing, hanging, hoisting, lifting, placing, pushing, removing, unhooking, and unlocking.

In view of the foregoing disadvantages inherent in the known type of fish cutting device now present in the prior art, the present invention provides an improved fish cutting device, which will be described subsequently in great detail, is to provide a new and improved fish cutting device which is not anticipated, rendered obvious, suggested, or even implied by the prior art, either alone or in any combination thereof.

To attain this, the present invention essentially comprises a bucket and a lid attached to the bucket. The lid includes a bottom plate, a hinge and a top plate. The bottom plate has at least one orifice with a corresponding cutting edge set attached to the bottom plate, so that a portion of the cutting edge set traverses across the orifice in the bottom plate. The top plate is pivotally attached to the bottom plate. The top plate has at least one convex protrusion attached to the lower surface of the top plate which is correspondingly aligned with the orifice of the bottom plate. When the lid is in a closed position then a portion of the convex protrusion is slidably inserted through a portion of the orifice of the bottom plate. Each convex protrusion also has a channel set etched in it. Each channel set of each convex protrusion has a configuration matching the corresponding cutting edge set traversing across the corresponding orifice of the bottom plate.

There has thus been outlined, rather broadly, the more important features of the invention in order that the detailed description thereof that follows may be better understood, and in order that the present contribution of the art may be better appreciated.

The invention may also include a handle attached to the top plate of the lid. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fish cutting device that has all the advantages of the prior art fish cutting device and none of the disadvantages.

It is another object of the present invention to provide a new and improved fish cutting device that may be easily and efficiently manufactured and marketed.

An even further object of the present invention is to provide a new and improved fish cutting device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new fish cutting device that provides in the apparatuses and methods of the prior art some of the advantages thererof, while simultaneously overcoming some of the disadvantages normally associated therewith.

Even still another object of the present invention is to provide a fish cutting device having a bucket and a lid attached to the bucket in which the lid includes a bottom plate, a hinge and a top plate. The bottom plate having at least one orifice with a corresponding cutting edge set attached to the bottom plate, so that a portion of the cutting edge set traverses across the orifice in the bottom plate. The top plate having at least one convex protrusion attached to the lower surface of the top plate which is correspondingly aligned with the orifice of the bottom plate. When the lid is in a closed position then a portion of the convex protrusion is slidably inserted through a portion of the orifice of the bottom plate. Each convex protrusion also having a channel set etched in it. Each channel set of each convex protrusion having a configuration matching the corresponding cutting edge set traversing across the corresponding orifice of the bottom plate. This makes it possible to rapidly cut fish into a plurality of bait pieces.

Lastly, it is an object of the present invention to provide a new and improved method of using comprises the steps of detaching, freezing, getting, grabbing, hanging, hoisting, lifting, placing, pushing, removing, unhooking, and unlocking.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
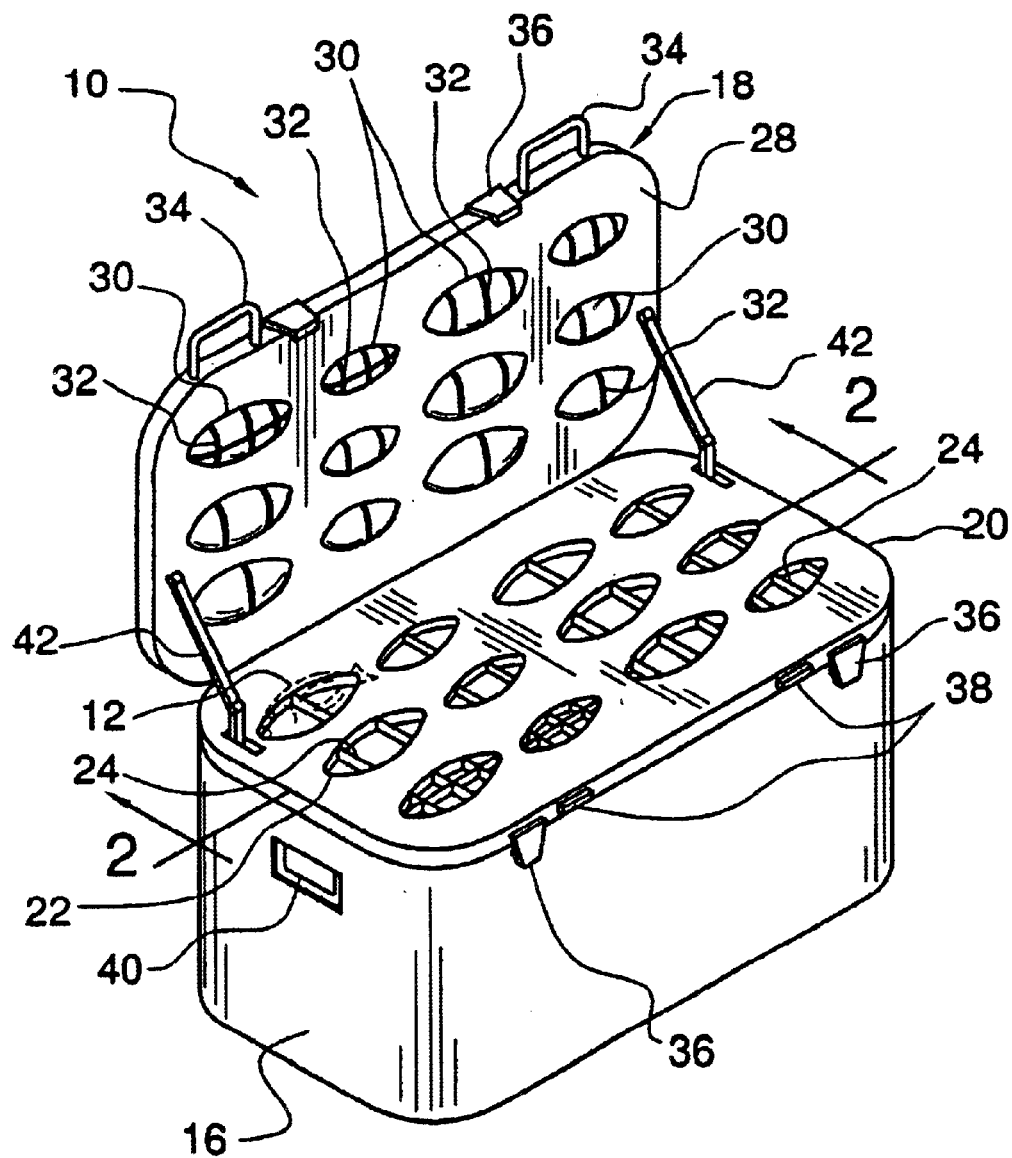
FIG. 1 is a perspective view of a preferred embodiment of the fish cutting device constructed in accordance with the principles of the present invention.

Referring now to the drawings, and in particular FIGS. 1 to 6 thereof, one preferred embodiment of the present invention is shown and generally designated by the reference numeral 10. One preferred embodiment of a device 10 for cutting fish 12 into bait pieces 14, the device 10 comprising: a bucket 16; and a lid 18 attached to the bucket 16. The lid 18 includes a bottom plate 20, a hinge 26 and a top plate 28. The bottom plate 20 is attached to the bucket 16, in which the bottom plate 20 has a first orifice 22 in the bottom plate 20 and a first cutting edge set 24 attached to the bottom plate 20, the first cutting edge set 24 traverses across the first orifice 22. The hinge 26 is attached to the bottom plate 20. The top plate 28 is attached to the first hinge 26, wherein the top plate 28 is pivotally attached to the bottom plate 20. When the top plate 28 is pivoted downwardly towards the bottom plate 20 so that a lower surface of the top plate 28 substantially faces an upper surface of the bottom plate 20 then the lid 18 is in a closed position. When the top plate 28 is pivoted upwardly away from the bottom plate 20 so that the lower surface of the top plate 28 does not substantially face the upper surface of the bottom plate 20 then the lid 18 is in an open position. The top plate 28 having a first convex protrusion 30 attached to the lower surface of the top plate 28. The first convex protrusion 30 of the top plate 28 is correspondingly aligned with the first orifice 22 of the bottom plate 20 so that when the lid 18 is in the closed position then a portion of the first convex protrusion 30 is slidably inserted through a portion of the first orifice 22 of the bottom plate 20, and so that when the lid 18 is in the open position then the first convex protrusion 30 of the top plate 28 is slidably withdrawn from the first orifice 22 of the bottom plate 20. The first convex protrusion 30 has a first channel set 32 etched into the first convex protrusion 30 of the top plate 28, in which the first channel set 32 etched into the first convex protrusion 30 correspondingly complementarily matching the first cutting edge set 24 traversing across the first orifice 22 of the bottom plate 20.

Another preferred embodiment of the device 10 comprises: a bucket 16; and a lid 18 attached to the bucket 16, the lid 18 including: a bottom plate 20 attached to the bucket 16, the bottom plate 20 having: a plurality of orifices 22; and a plurality of cutting edge set 24s attached to the bottom plate 20, each individual cutting edge set 24 of the plurality of cutting edge set 24s traverses across each corresponding individual orifice 22 of the plurality of orifices 22; a hinge 26 attached to the bottom plate 20; and a top plate 28 attached to the first hinge 26, wherein the top plate 28 is pivotally attached to the bottom plate 20, when the top plate 28 is pivoted downwardly towards the bottom plate 20 so that a lower surface of the top plate 28 substantially faces an upper surface of the bottom plate 20 then the lid 18 is in a closed position, when the top plate 28 is pivoted upwardly away from the bottom plate 20 so that the lower surface of the top plate 28 does not substantially face the upper surface of the bottom plate 20 then the lid 18 is in an open position, the top plate 28 having a plurality of convex protrusions 30 attached to the lower surface of the top plate 28, when the lid 18 is in the closed position then a portion of each convex protrusion 30 of the plurality of convex protrusions 30 of the top plate 28 is slidably inserted through a portion of each corresponding orifice 22 of the plurality of orifices 22 in the bottom plate 20, when the lid 18 is in the open position then each convex protrusion 30 of the plurality of convex protrusions 30 of the top plate 28 is slidably withdrawn from each corresponding orifice 22 of the plurality of orifices 22 in the bottom plate 20; each convex protrusion 30 of the plurality of convex protrusions 30 attached to the lower surface of the top plate 28 of the lid 18 having a channel set 32 etched into each convex protrusion 30 of the convex protrusions 30, each channel set 32 of each corresponding convex protrusion 30 of the plurality of convex protrusions 30 of the top plate 28 correspondingly complementarily matching each corresponding a cutting edge set 24 traversing across each orifice 22 of the plurality of orifices 22 in the bottom plate 20.

An optional second orifice 22, second cutting edge set 24, second convex protrusion 30 having a second channel set 32 may be added to the device. The bottom plate 20 includes the second orifice 22 in the bottom plate 20 and also includes the second cutting edge set 24 attached to the bottom plate 20, the second cutting edge set 24 traverses across the second orifice 22. The top plate 28 includes the second convex protrusion 30 attached to the lower surface of the top plate 28, in which the second convex protrusion 30 of the top plate 28 is correspondingly aligned with the second orifice 22 of the bottom plate 20 so that when the lid 18 is in the closed position then a portion of the second convex protrusion 30 is slidably inserted through a portion of the second orifice 22 of the bottom plate 20, so that when the lid 18 is in the open position then the second convex protrusion 30 of the top plate 28 is slidably withdrawn from the second orifice 22 of the bottom plate 20. The second convex protrusion 30 includes the second channel set 32 etched into the second convex protrusion 30 of the top plate 28. The second channel set 32 etched into the second convex protrusion 30 correspondingly complementarily matching the second cutting edge set 24 traversing across the second orifice 22 of the bottom plate 20.

An optional third orifice 22, third cutting edge set 24, third convex protrusion 30 having a third channel set 32 may be added to the device. The bottom plate 20 includes the third orifice 22 in the bottom plate 20 and also includes the third cutting edge set 24 attached to the bottom plate 20, the third cutting edge set 24 traverses across the third orifice 22. The top plate 28 includes the third convex protrusion 30 attached to the lower surface of the top plate 28, in which the third convex protrusion 30 of the top plate 28 is correspondingly aligned with the third orifice 22 of the bottom plate 20 so that when the lid 18 is in the closed position then a portion of the third convex protrusion 30 is slidably inserted through a portion of the third orifice 22 of the bottom plate 20, so that when the lid 18 is in the open position then the third convex protrusion 30 of the top plate 28 is slidably withdrawn from the third orifice 22 of the bottom plate 20. The third convex protrusion 30 includes the third channel set 32 etched into the third convex protrusion 30 of the top plate 28. The third channel set 32 etched into the third convex protrusion 30 correspondingly complementarily matching the third cutting edge set 24 traversing across the third orifice 22 of the bottom plate 20.

An optional handle 34 may be added to the device. The handle 34 is attached to the upper surface of the top plate 28 of the lid 18.

An optional latch 36 and an associated lock pin 38 may be added to the device 10. One preferred configuration is that the latch 36 is pivotally attached to the bucket 16; and that the lock pin 38 is attached to the bottom plate 20, so that when the latch 36 is locked onto the lock pin 38 then the bottom plate 20 is locked onto the bucket 16, when the latch 36 is not locked onto the lock pin 38 then the bottom plate 20 is not locked onto the bucket 16. Another preferred configuration is that the latch 36 is pivotally attached to the top plate 28; and that the lock pin 38 is attached to the bottom plate 20, so that when the latch 36 is locked onto the lock pin 38 then the bottom plate 20 is locked onto the top plate 28, when the latch 36 is not locked onto the lock pin 38 then the bottom plate 20 is not locked onto the top plate 28. Yet another preferred configuration is that the latch 36 is pivotally attached to the bottom plate 20; and that the lock pin 38 attached to the bucket 16, so that when the latch 36 is locked onto the lock pin 38 then the bottom plate 20 is locked onto the bucket 16, when the latch 36 is not locked onto the lock pin 38 then the bottom plate 20 is not locked onto the bucket 16. Even yet another preferred configuration is that the latch 36 is pivotally attached to the bottom plate 20; and that the lock pin 38 is attached to the top plate 28, so that when the latch 36 is locked onto the lock pin 38 then the bottom plate 20 is locked onto the top plate 28, when the latch 36 is not locked onto the lock pin 38 then the bottom plate 20 is not locked onto the top plate 28.

An optional pair of side grips 40 attached to the bucket 16 may be added to the device 10.

An optional pliable brace 42 attached onto the bottom plate 20 and attached to the top plate 28 may be added to the device 10.

An optional internal wall 44 attached to the bucket 16 may also be added to the device 10.

An optional detachable ice pack 46 attached to the bucket 16 may also be added to the device 10.

An optional crevice 48 recessed within the bucket 16 may be added to the device 10. The crevice 48 is designed to be capable of holding a detachable ice pack 46.

An optional second hinge 26 may be added to the device 10.

The lid 18 may be connected to the bucket 16 by any commercially known means of connecting. One preferred configuration is that an optional second hinge 26 is attached to the bucket 16 and attached to the bottom plate 20 of the lid 18, whereby the lid 18 is pivotally attached to the bucket 16. Another preferred configuration is that the lid 18 is detachable attached to the bucket 16 via a sleeve in the lid 18 in which the sleeve slidably fits over the bucket 16.

The cutting edge set 24 may be selected from any commercially known means for slicing items apart. One preferred configuration is that the cutting edge set 24 is selected from the group consisting of knife blades, razor blades and wires.

One preferred embodiment of a method of using a fish cutting device 10 comprises the steps of detaching, freezing, getting, grabbing, hanging, hoisting, lifting, placing, pushing, removing, unhooking, and unlocking. The obtaining step comprises obtaining the fish 12 cutting device 10 comprising: a bucket 16; and a lid 18 attached to the bucket 16, the lid 18 including: a bottom plate 20 attached to the bucket 16, the bottom plate 20 having: a first orifice 22 in the bottom plate 20; a first cutting edge set 24 attached to the bottom plate 20, the first cutting edge set 24 traverses across the first orifice 22; a second orifice 22 in the bottom plate 20; a second cutting edge set 24 attached to the bottom plate 20, the second cutting edge set 24 traverses across the second orifice 22; a third orifice 22 in the bottom plate 20; and a third cutting edge set 24 attached to the bottom plate 20, the third cutting edge set 24 traverses across the third orifice 22; a hinge 26 attached to the bottom plate 20; a top plate 28 attached to the first hinge 26, wherein the top plate 28 is pivotally attached to the bottom plate 20, when the top plate 28 is pivoted downwardly towards the bottom plate 20 so that a lower surface of the top plate 28 substantially faces an upper surface of the bottom plate 20 then the lid 18 is in a closed position, when the top plate 28 is pivoted upwardly away from the bottom plate 20 so that the lower surface of the top plate 28 does not substantially face the upper surface of the bottom plate 20 then the lid 18 is in an open position, the top plate 28 having a first convex protrusion 30 attached to the lower surface of the top plate 28, the first convex protrusion 30 of the top plate 28 is correspondingly aligned with the first orifice 22 of the bottom plate 20 so that when the lid 18 is in the closed position then a portion of the first convex protrusion 30 is slidably inserted through a portion of the first orifice 22 of the bottom plate 20, when the lid 18 is in the open position then the first convex protrusion 30 of the top plate 28 is slidably withdrawn from the first orifice 22 of the bottom plate 20, the first convex protrusion 30 having a first channel set 32 etched into the first convex protrusion 30 of the top plate 28, the first channel set 32 etched into the first convex protrusion 30 correspondingly complementarily matching the first cutting edge set 24 traversing across the first orifice 22 of the bottom plate 20; a second convex protrusion 30 attached to the lower surface of the top plate 28, the second convex protrusion 30 of the top plate 28 is correspondingly aligned with the second orifice 22 of the bottom plate 20 so that when the lid 18 is in the closed position then a portion of the second convex protrusion 30 is slidably inserted through a portion of the second orifice 22 of the bottom plate 20, when the lid 18 is in the open position then the second convex protrusion 30 of the top plate 28 is slidably withdrawn from the second orifice 22 of the bottom plate 20, wherein the second convex protrusion 30 having a second channel set 32 etched into the second convex protrusion 30 of the top plate 28, the second channel set 32 etched into the second convex protrusion 30 correspondingly complementarily matching the second cutting edge set 24 traversing across the second orifice 22 of the bottom plate 20; and a third convex protrusion 30 attached to the lower surface of the top plate 28, the third convex protrusion 30 of the top plate 28 is correspondingly aligned with the third orifice 22 of the bottom plate 20 so that when the lid 18 is in the closed position then a portion of the third convex protrusion 30 is slidably inserted through a portion of the third orifice 22 of the bottom plate 20, when the lid 18 is in the open position then the third convex protrusion 30 of the top plate 28 is slidably withdrawn from the third orifice 22 of the bottom plate 20, wherein the third convex protrusion 30 having a third channel set 32 etched into the third convex protrusion 30 of the top plate 28, the third channel set 32 etched into the third convex protrusion 30 correspondingly complementarily matching the third cutting edge set 24 traversing across the third orifice 22 of the bottom plate 20; a handle 34 attached to the upper surface of the top plate 28 of the lid 18; a first latch 36 pivotally attached to the bucket 16; a first lock pin 38 attached to the bottom plate 20, when the first latch 36 is locked onto the first lock pin 38 then the bottom plate 20 is locked onto the bucket 16, when the first latch 36 is not locked onto the first lock pin 38 then the bottom plate 20 is not locked onto the bucket 16; a second latch 36 pivotally attached to the top plate 28; a second lock pin 38 attached to the bottom plate 20, when the second latch 36 is locked onto the second lock pin 38 then the bottom plate 20 is locked onto the top plate 28: when the second latch 36 is not locked onto the second lock pin 38 then the bottom plate 20 is not locked onto the top plate 28; a pair of side grips 40 attached to the bucket 16; an ice pack 46 detachably attached to the bucket 16; and a crevice 48 recessed within the bucket 16, the crevice 48 capable of holding the ice pack 46, wherein the lid 18 is detachable attached to the bucket 16. The getting step comprises getting a bunch of fish 12. The freezing step comprises freezing the ice pack 46. The hanging step comprises hanging the ice pack 46 into the crevice 48 recessed within the bucket 16. The grabbing step comprises grabbing onto the pair of side grips 40 attached to the bucket 16. The hoisting step comprises hoisting the device 10 to a desired work location, the hoisting step performed while grabbing onto the pair of side grips 40 attached to the bucket 16. The unlocking step comprises unlocking the second latch 36 pin from the second lock pin 38 so that the bottom plate 20 is not locked onto the top plate 28. The lifting step comprises lifting upwardly onto the handle 34 of the device 10 so that the lid 18 is moved to the open position, the lifting step performed subsequent to the unlocking step. The placing step comprises placing a first, second and third fish 12 from the bunch of fish 12 into the first, second and third orifices 22 of the bottom plate 20 of the lid 18 of the device 10, respectively, the placing step performed subsequent to the lifting step. The pushing step comprises pushing downwardly onto the handle 34 of the device 10 so that the lid 18 is moved from the open position to the closed position and so that the first, second and third fish 12 from the bunch of fish 12 are cut into pieces and the fish 12 pieces are allowed to drop into the bucket 16 though the first, second and third orifices 22 of the bottom plate 20, respectively, the pushing step performed subsequently to the placing step. The unhooking step comprises unhooking the first latch 36 pivotally attached to the bucket 16 from the first lock pin 38 attached to the bottom plate 20, so that the first latch 36 is not locked onto the first lock pin 38 and that the bottom plate 20 is not locked onto the bucket 16. The detaching step comprises detaching the lid 18 from the bucket 16, the detaching step performed subsequently to the pushing and unhooking steps. The removing step comprises removing the pieces of fish 12 in the bucket 16, the removing step performed subsequently to the detaching step.

Referring now to FIG. 1, which depicts a perspective view of a preferred embodiment of the fish-cutting device 10 showing a bucket 16, a lid 18, a handle 34, a latch 36, a stop pin 38, a brace 42, and a side grip 40. The lid 18 is shown including a bottom plate 20, a hinge 26 and a top plate 28. The bottom plate 20 is attached to the bucket 16, in which the bottom plate 20 has a plurality of orifices 22 in the bottom plate 20 and a plurality of cutting edge set 24 attached to the bottom plate 20, in which each cutting edge set 24 traverses across a corresponding orifice 22. The top plate 28 is shown having a plurality of convex protrusions 30 attached to the lower surface of the top plate 28. Each convex protrusion 30 of the top plate 28 is correspondingly aligned with a corresponding orifice 22 of the bottom plate 20 so that when the lid 18 is in the closed position then a portion of the each convex protrusion 30 is slidably inserted through a portion of the each orifice 22 of the bottom plate 20, and so that when the lid 18 is in the open position then the first convex protrusion 30 of the top plate 28 is slidably withdrawn from the first orifice 22 of the bottom plate 20. Each convex protrusion 30 is shown having a first channel set 32 etched into a corresponding convex protrusion 30 of the top plate 28, in which each channel set 32 etched into each convex protrusion 30 correspondingly complementarily matching the cutting edge set 24 traversing across the each correspondingly aligned orifice 22 of the bottom plate 20. The handle 34 is shown attached to the upper surface of the top plate 28 of the lid 18. The side grip 40 is shown attached to the bucket 16. The brace 42 is shown attached onto the bottom plate 20 and attached to the top plate 28 so that the two plates are further stabilized. A plurality of latches 36 and associated stop pins 38 are shown attached to the device 10 which are capable of securing the device 10.

Figure 2:
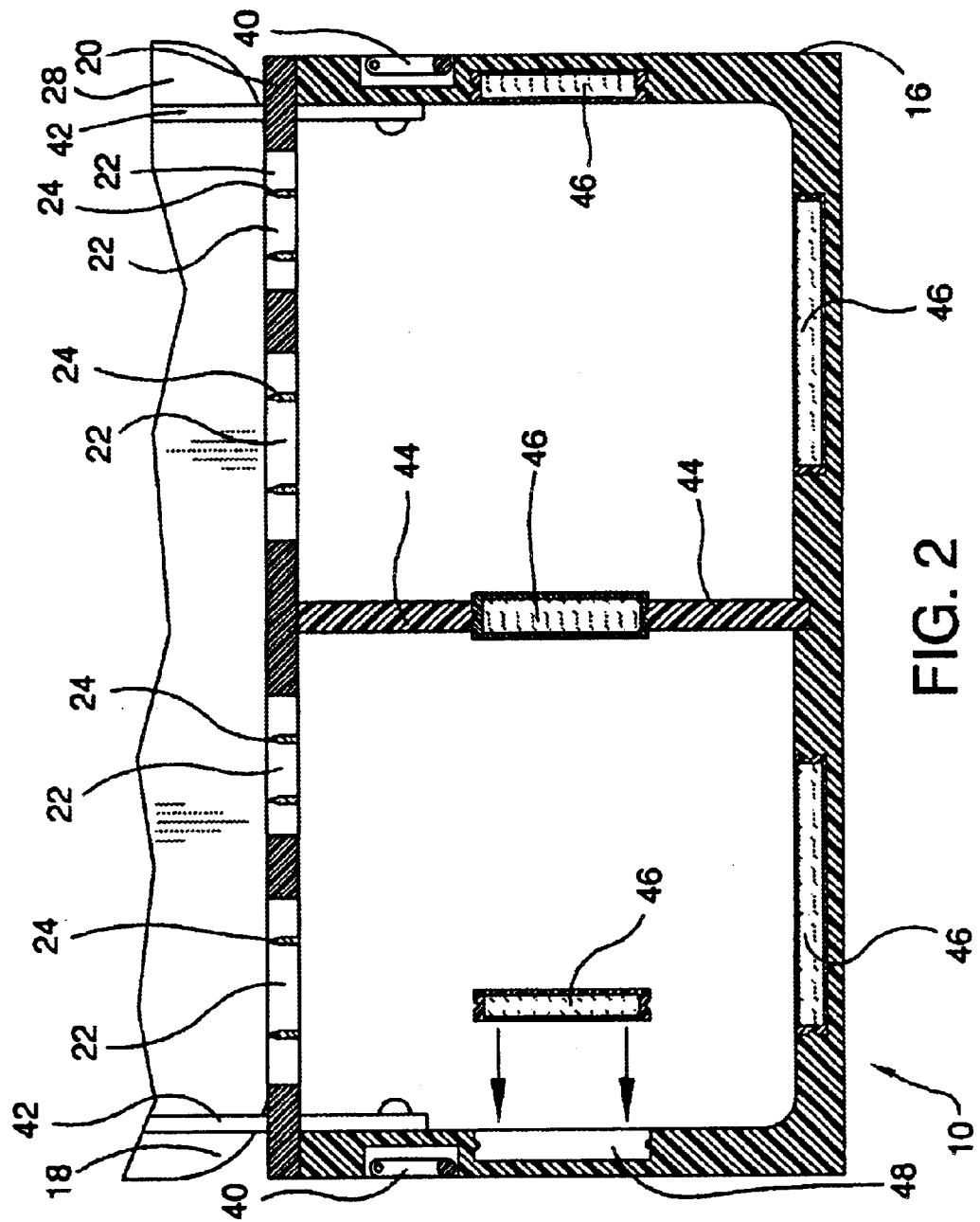
FIG. 2 is a cross sectional front plan view of a preferred embodiment of the fish cutting device of the present invention.

Referring now to FIG. 2 which depicts a cross sectional front plan view of a preferred embodiment of the fish cutting device 1 0 showing a bucket 16, a lid 18, a handle 34, a brace 42, a pair of grips 40, an internal wall 44, an ice pack 46 and a crevice 48. The lid 18 is shown including a bottom plate 20 and a top plate 28. The bottom plate 20 is shown attached to the bucket 16, in which the bottom plate 20 has a plurality of orifices 22 in the bottom plate 20 and a plurality of cutting edge set 24 attached to the bottom plate 20, in which each cutting edge set 24 traverses across a corresponding orifice 22. The top plate 28 is shown having a plurality of convex protrusions 30 attached to the lower surface of the top plate 28. Each convex protrusion 30 of the top plate 28 is shown having a correspondingly aligned orifice 22 of the bottom plate 20 so that when the lid 18 is in the closed position then a portion of the each convex protrusion 30 is slidably inserted through a portion of the each orifice 22 of the bottom plate 20, and so that when the lid 18 is in the open position then the first convex protrusion 30 of the top plate 28 is slidably withdrawn from the first orifice 22 of the bottom plate 20. Each convex protrusion 30 is shown having a first channel set 32 etched into a corresponding convex protrusion 30 of the top plate 28, in which each channel set 32 etched into each convex protrusion 30 correspondingly complementarily matching the cutting edge set 24 traversing across the each correspondingly aligned orifice 22 of the bottom plate 20. The side grip 40 is shown attached to the bucket 16. The brace 42 is shown attached to the top plate 28 so that the two plates. The ice pack 46 is shown insertable into any number of crevices 46 within the bucket 16. The internal wall 44 is shown segmenting the bucket 16 into two storage areas.

Figure 3:
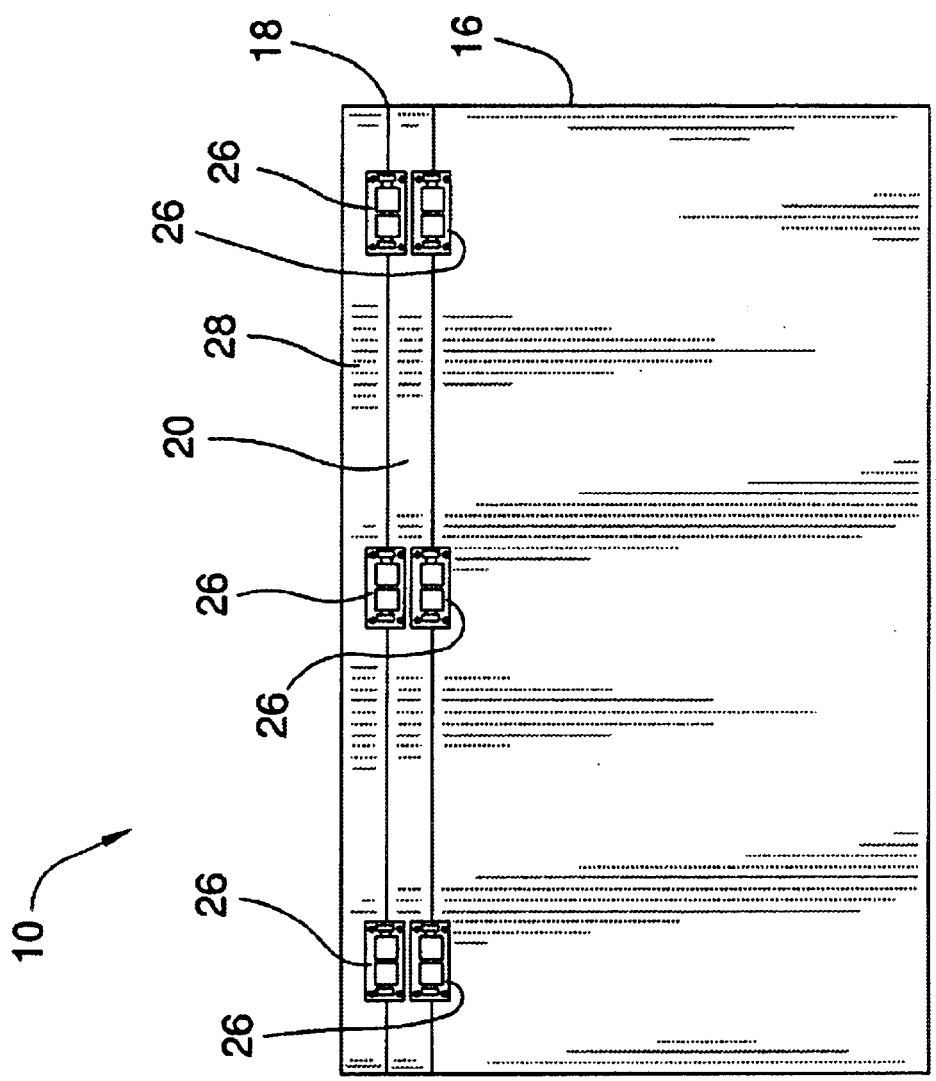
FIG. 3 is a back plan view of a preferred embodiment of the fish cutting device of the present invention.

Referring now to FIG. 3 which depicts a back plan view of a preferred embodiment of the fish cutting device 10 showing a bucket 16, a lid 18, and a plurality of hinges 26. One set of hinges 26 is shown attached to the bottom plate 20 and to the top plate 28, wherein the top plate 28 is pivotally attached to the bottom plate 20. Another set of hinges is shown attached to the bottom plate 20 and to the bucket 16, wherein the bottom plate 20 is pivotally attached to the bucket 16.

Figure 4:
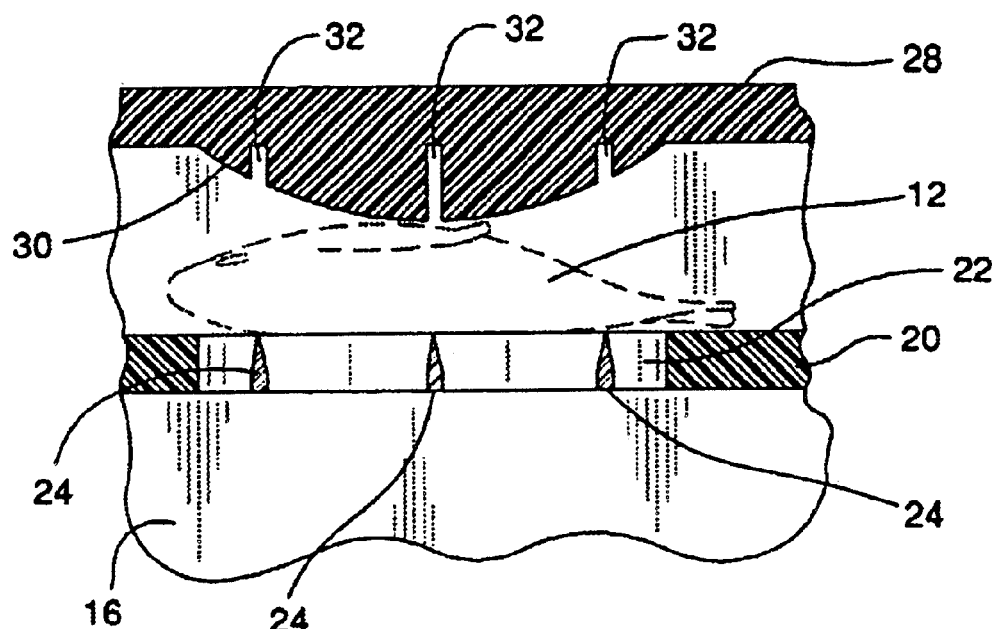
FIG. 4 is a cross sectional partial front plan view of a preferred embodiment of the fish cutting device of the present invention.
Figure 5:
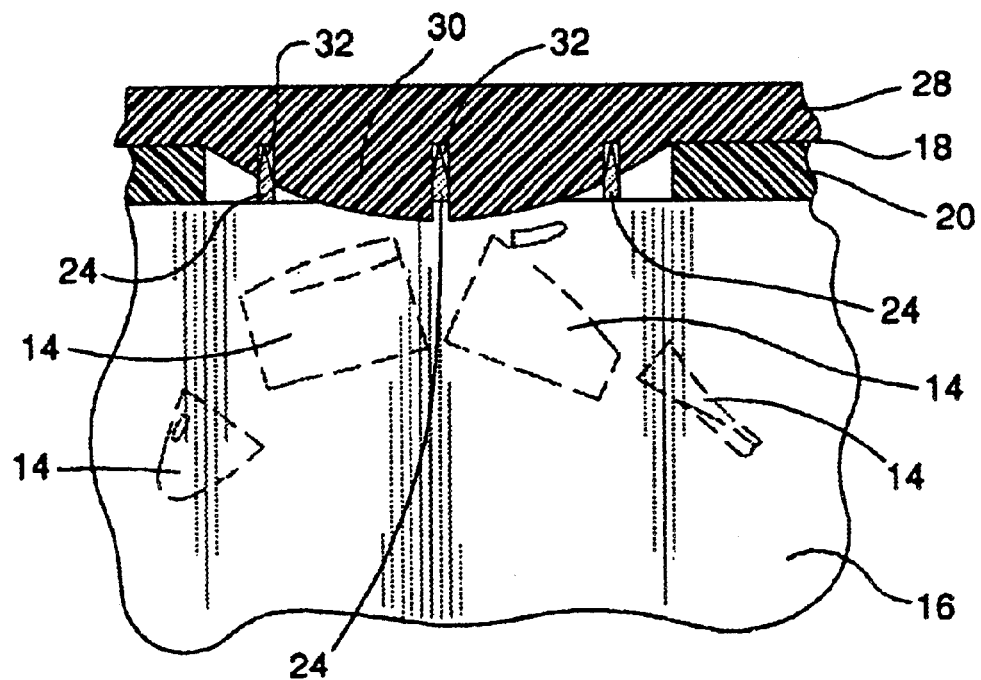
FIG. 5 is a cross sectional partial front plan view of a preferred embodiment of the fish cutting device of the present invention.

Referring now to FIG. 4 and FIG. 5 which depicts a cross sectional partial front plan view of a preferred embodiment of the fish cutting device 10 showing a fish 12 may be mounted onto an orifice 22 in the bottom plate 20, in which the fish is cut into bait pieces when the top plate 28 is subsequently pushed downwardly towards the bottom plate 20.

Figure 6:
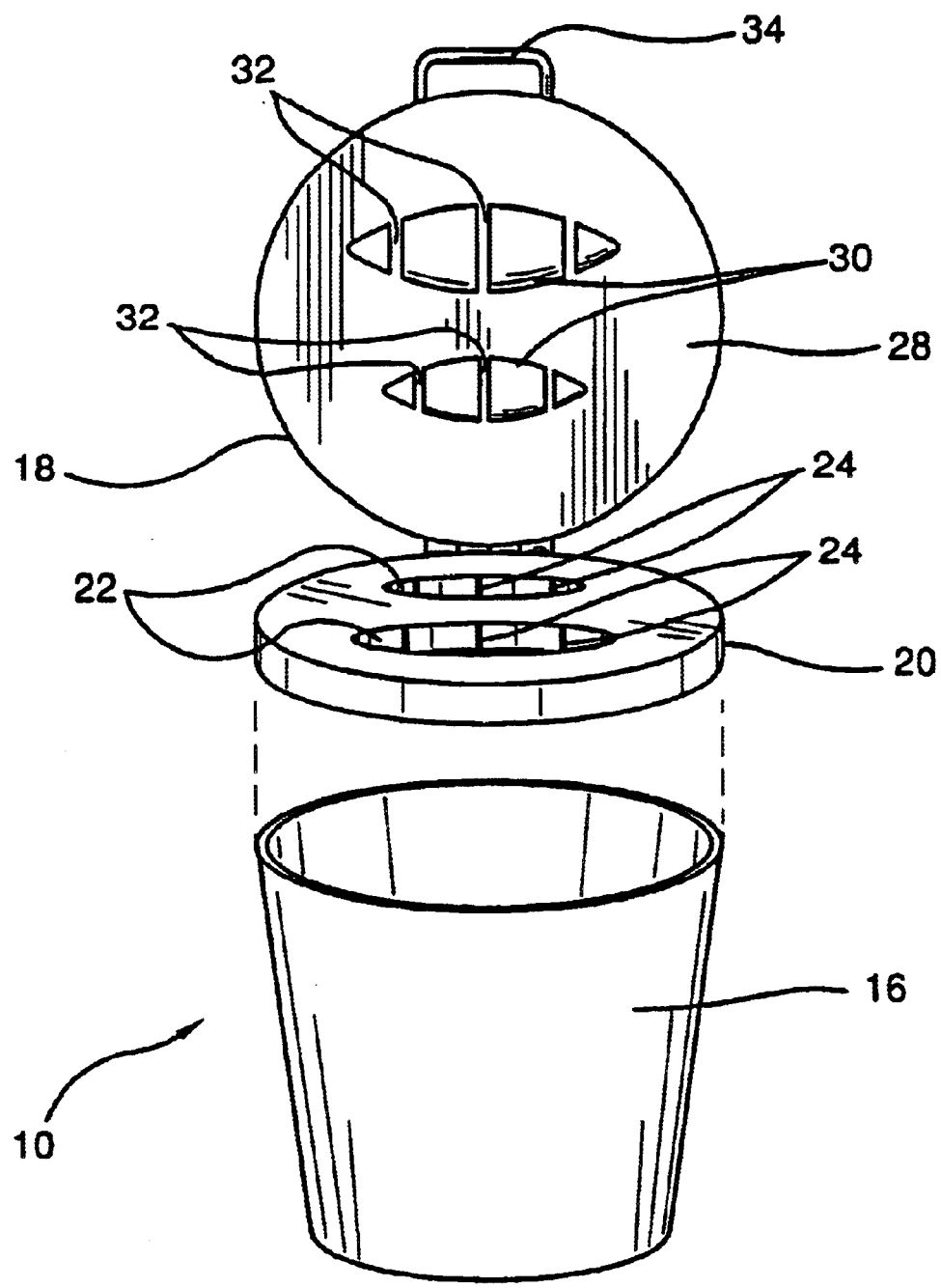
FIG. 6 is a perspective view of a preferred embodiment of the fish cutting device of the present invention.

Referring now to FIG. 6 which depicts a perspective view of a preferred embodiment of the fish cutting device 10 showing the lid 18 being detachably attachable to the bucket 16 via a sliding sleeve mechanism.

As to the manner of usage and operation of the present invention, the same should be apparent from the above description. Accordingly, no further discussion relating to the manner of usage and operation will be provided.

While a preferred embodiment of the fish cutting device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes or variations, thereof, or the them "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combination any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A device for cutting fish into bait pieces, said device comprising:
   a bucket; and
   a lid attached to said bucket, said lid including:
      a bottom plate attached to said bucket, said bottom plate having:
         a first orifice in said bottom plate; and
         a first cutting edge set attached to said bottom plate, said first cutting edge set traverses across said first orifice;
      a hinge attached to said bottom plate; and
      a top plate attached to said hinge, wherein said top plate is pivotally attached to said bottom plate, when said top plate is pivoted downwardly towards said bottom plate so that a lower surface of said top plate substantially faces an upper surface of said bottom plate then said lid is in a closed position, when said top plate is pivoted upwardly away from said bottom plate so that the lower surface of said top plate does not substantially face the upper surface of said bottom plate then said lid is in an open position,
         said top plate having a first convex protrusion attached to the lower surface of said top plate, said first convex protrusion of said top plate is correspondingly aligned with said first orifice of said bottom plate so that when said lid is in the closed position then a portion of said first convex protrusion is slidably inserted through a portion of said first orifice of said bottom plate, when said lid is in the open position then said first convex protrusion of said top plate is slidably withdrawn from said first orifice of said bottom plate,
         said first convex protrusion having a first channel set etched into said first convex protrusion of said top plate, said first channel set etched into said first convex protrusion correspondingly complementarily matching said first cutting edge set traversing across said first orifice of said bottom plate.

2. The device of claim 1 further comprising:
   said bottom plate having
      a second orifice in said bottom plate; and
      a second cutting edge set attached to said bottom plate, said second cutting edge set traverses across said second orifice; and
   said top plate having
      a second convex protrusion attached to the lower surface of said top plate, said second convex protrusion of said top plate is correspondingly aligned with said second orifice of said bottom plate so that when said lid is in the closed position then a portion of said second convex protrusion is slidably inserted through a portion of said second orifice of said bottom plate, when said lid is in the open position then said second convex protrusion of said top plate is slidably withdrawn from said second orifice of said bottom plate,
   wherein said second convex protrusion having a second channel set etched into said second convex protrusion of said top plate, said second channel set etched into said second convex protrusion correspondingly complementarily matching said second cutting edge set traversing across said second orifice of said bottom plate.

3. The device of claim 2 further comprising:
   said bottom plate having
      a third orifice in said bottom plate; and
      a third cutting edge set attached to said bottom plate, said third cutting edge set traverses across said third orifice; and
   said top plate having
   a third convex protrusion attached to the lower surface of said top plate, said third convex protrusion of said top plate is correspondingly aligned with said third orifice of said bottom plate so that when said lid is in the closed position then a portion of said third convex protrusion is slidably inserted through a portion of said third orifice of said bottom plate, when said lid is in the open position then said third convex protrusion of said top plate is slidably withdrawn from said third orifice of said bottom plate,
      wherein said third convex protrusion having a third channel set etched into said third convex protrusion of said top plate, said third channel set etched into said third convex protrusion correspondingly complementarily matching said third cutting edge set traversing across said third orifice of said bottom plate.

4. The device of claim 1 further comprising a latch pivotally attached to said bucket; and a lock pin attached to said bottom plate, when said latch is locked onto said lock pin then said bottom plate is locked onto said bucket, when said latch is not locked onto said lock pin then said bottom plate is not locked onto said bucket.

5. The device of claim 1 further comprising a latch pivotally attached to said top plate; and a lock pin attached to said bottom plate, when said latch is locked onto said lock pin then said bottom plate is locked onto said top plate, when said latch is not locked onto said lock pin then said bottom plate is not locked onto said top plate.

6. The device of claim 1 further comprising:
   a first latch pivotally attached to said bucket; and a first lock pin attached to said bottom plate, when said first latch is locked onto said first lock pin then said bottom plate is locked onto said bucket, when said first latch is not locked onto said first lock pin then said bottom plate is not locked onto said bucket; and
   a second latch pivotally attached to said top plate; and a second lock pin attached to said bottom plate, when said second latch is locked onto said second lock pin then said bottom plate is locked onto said top plate, when said second latch is not locked onto said second lock pin then said bottom plate is not locked onto said top plate.

7. The device of claim 1 further comprising a latch pivotally attached to said bottom plate; and a lock pin attached to said bucket, when said latch is locked onto said lock pin then said bottom plate is locked onto said bucket, when said latch is not locked onto said lock pin then said bottom plate is not locked onto said bucket.

8. The device of claim 1 further comprising a latch pivotally attached to said bottom plate; and a lock pin attached to said top plate, when said latch is locked onto said lock pin then said bottom plate is locked onto said top plate, when said latch is not locked onto said lock pin then said bottom plate is not locked onto said top plate.

9. The device of claim 1 further comprising
   a first latch pivotally attached to said bottom plate; and a first lock pin attached to said bucket, when said first latch is locked onto first said lock pin then said bottom plate is locked onto said bucket, when said first latch is not locked onto said first lock pin then said bottom plate is not locked onto said bucket; and
   a second latch pivotally attached to said bottom plate; and a second lock pin attached to said top plate, when said second latch is locked onto said second lock pin then said bottom plate is locked onto said top plate, when said second latch is not locked onto said second lock pin then said bottom plate is not locked onto said top plate.

10. The device of claim 1 further comprising a pair of side grips attached to said bucket.

11. The device of claim 1 further comprising a pliable brace attached onto said bottom plate and attached to said top plate.

12. The device of claim 1 further comprising an internal wall attached to said bucket.

13. The device of claim 1 further comprising an ice pack detachably attached to said bucket.

14. The device of claim 1 further comprising a crevice recessed within said bucket, said crevice capable of holding a detachable ice pack.

15. The device of claim 1 further comprising a second hinge, said second hinge is attached to said bucket and attached to said bottom plate of said lid, whereby said lid is pivotally attached to said bucket.

16. The device of claim 1 wherein said lid is detachable attached to said bucket.

17. The device of claim 1 wherein said cutting edge set is selected from the group consisting of knife blades, razor blades and wires.

18. A device cutting fish into bait pieces, said device comprising:
   a bucket; and
   a lid attached to said bucket, said lid including:
      a bottom plate attached to said bucket, said bottom plate having:
         a plurality of orifices; and
         a plurality of cutting edge sets attached to said bottom plate, each
         individual cutting edge set of said plurality of cutting edge sets traverses
         across each corresponding individual orifice of said plurality of orifices;
      a hinge attached to said bottom plate; and
      a top plate attached to said hinge, wherein said top plate is pivotally attached to said bottom plate,
         when said top plate is pivoted downwardly towards said bottom plate so that a lower surface of said top plate substantially faces an upper surface of said bottom plate then said lid is in a closed position, when the top plate is pivoted upwardly away from said bottom plate so that the lower surface of said top plate does not substantially face the upper surface of said bottom plate then said lid is in an open position,
      said top plate having a plurality of convex protrusions attached to the lower surface of said top plate, when said lid is in the closed position then a portion of each convex protrusion of said plurality of convex protrusions of said top plate is slidably inserted through a portion of each corresponding orifice of said plurality of orifices in said bottom plate, when said lid is in the open position then each convex protrusion of said plurality of convex protrusions of said top plate is slidably withdrawn from each corresponding orifice of said plurality of orifices in said bottom plate;
      each convex protrusion of said plurality of convex protrusions attached to said lower surface of said top plate of said lid having a channel set etched into each convex protrusion of said convex protrusions, each channel set of each corresponding convex protrusion of said plurality of convex protrusions of said top plate correspondingly complementarily matching each corresponding a cutting edge set traversing across each orifice of said plurality of orifices in said bottom plate.

* * * * *